(12) United States Patent
Rediger et al.

(10) Patent No.: US 7,754,659 B2
(45) Date of Patent: Jul. 13, 2010

(54) REDUCING FLOW-BACK IN WELL TREATING MATERIALS

(75) Inventors: Richard Rediger, Conyers, GA (US);
Michael J. Aron, Snellville, GA (US);
James Wright, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 397 days.

(21) Appl. No.: 11/803,688

(22) Filed: May 15, 2007

(65) Prior Publication Data

US 2008/0283243 A1 Nov. 20, 2008

(51) Int. Cl.
*C09K 8/74* (2006.01)
*E21B 43/267* (2006.01)

(52) U.S. Cl. .................. 507/269; 166/280.1; 166/280.2

(58) Field of Classification Search ................. 428/403; 166/280.1; 507/269
See application file for complete search history.

(56) References Cited

U.S. PATENT DOCUMENTS

| | | |
|---|---|---|
| 3,929,191 A | 12/1975 | Graham et al. |
| 4,073,343 A | 2/1978 | Harnsberger |
| 4,160,483 A | 7/1979 | Thomas et al. |
| 4,183,813 A | 1/1980 | Black et al. |
| 4,222,444 A | 9/1980 | Hamilton |
| 4,336,842 A | 6/1982 | Graham et al. |
| 4,439,489 A | 3/1984 | Johnson et al. |
| 4,493,875 A | 1/1985 | Beck et al. |
| 4,518,040 A | 5/1985 | Middleton |
| 4,527,627 A | 7/1985 | Graham et al. |
| 4,547,468 A | 10/1985 | Jones et al. |
| 4,569,394 A | 2/1986 | Sweatman et al. |
| 4,585,064 A | 4/1986 | Graham et al. |
| 4,665,990 A | 5/1987 | Perlman |
| 4,852,650 A | 8/1989 | Jennings et al. |
| 4,869,960 A | 9/1989 | Gibb et al. |
| 4,888,240 A | 12/1989 | Graham et al. |
| 4,923,714 A | 5/1990 | Gibb et al. |
| 5,005,641 A | 4/1991 | Mohaupt |
| 5,128,390 A | 7/1992 | Murphey et al. |
| 5,188,175 A | 2/1993 | Sweet |
| 5,217,074 A | 6/1993 | McDougall et al. |
| 5,311,946 A | 5/1994 | Harry et al. |
| 5,316,792 A | 5/1994 | Harry et al. |

(Continued)

FOREIGN PATENT DOCUMENTS

CA   1057649 A1   7/1979

(Continued)

OTHER PUBLICATIONS

International Search Report for PCT/US2007/072212 mailed on Nov. 27, 2007.

(Continued)

*Primary Examiner*—Timothy J. Kugel
*Assistant Examiner*—Aiqun Li
(74) *Attorney, Agent, or Firm*—Michael S. Kerns

(57) ABSTRACT

A composite proppant having a proppant substrate such as a porous ceramic or silica sand coated with magnetic particles and a method of propping a subterranean formation using a composition consisting essentially of the composite proppant.

19 Claims, 1 Drawing Sheet
(1 of 1 Drawing Sheet(s) Filed in Color)

U.S. PATENT DOCUMENTS

| | | | |
|---|---|---|---|
| 5,318,382 | A | 6/1994 | Cahill |
| 5,330,005 | A | 7/1994 | Card et al. |
| 5,370,184 | A | 12/1994 | McDougall et al. |
| 5,411,093 | A | 5/1995 | Jennings, Jr. |
| 5,422,183 | A | 6/1995 | Sinclair et al. |
| 5,425,994 | A | 6/1995 | Harry et al. |
| 5,439,055 | A | 8/1995 | Card et al. |
| 5,492,178 | A | 2/1996 | Nguyen et al. |
| 5,500,174 | A | 3/1996 | Scott |
| 5,501,274 | A | 3/1996 | Nguyen et al. |
| 5,501,275 | A | 3/1996 | Card et al. |
| 5,520,250 | A | 5/1996 | Harry et al. |
| 5,578,371 | A | 11/1996 | Taylor et al. |
| 5,582,249 | A | 12/1996 | Caveny et al. |
| 5,639,806 | A | 6/1997 | Johnson et al. |
| 5,656,176 | A | 8/1997 | Scott |
| 5,697,440 | A | 12/1997 | Weaver et al. |
| 5,728,302 | A * | 3/1998 | Connor et al. ............ 210/679 |
| 5,775,425 | A | 7/1998 | Weaver et al. |
| 5,787,986 | A | 8/1998 | Weaver et al. |
| 5,833,000 | A | 11/1998 | Weaver et al. |
| 5,837,656 | A | 11/1998 | Sinclair et al. |
| 5,839,510 | A | 11/1998 | Weaver et al. |
| 5,853,048 | A | 12/1998 | Weaver et al. |
| 5,916,933 | A | 6/1999 | Johnson et al. |
| 5,929,437 | A | 7/1999 | Elliott et al. |
| 5,948,734 | A | 9/1999 | Sinclair et al. |
| 5,955,144 | A | 9/1999 | Sinclair et al. |
| 5,964,291 | A | 10/1999 | Bourne et al. |
| 6,017,854 | A | 1/2000 | Van Slyke |
| 6,047,772 | A | 4/2000 | Weaver et al. |
| 6,059,034 | A | 5/2000 | Rickards et al. |
| 6,114,410 | A | 9/2000 | Betzold |
| 6,116,342 | A | 9/2000 | Clark et al. |
| 6,209,643 | B1 | 4/2001 | Nguyen et al. |
| 6,330,916 | B1 | 12/2001 | Rickards et al. |
| 6,364,018 | B1 | 4/2002 | Brannon et al. |
| 6,406,789 | B1 | 6/2002 | McDaniel et al. |
| 6,439,309 | B1 | 8/2002 | Matherly et al. |
| 6,528,157 | B1 | 3/2003 | Hussain et al. |
| 6,582,819 | B1 | 6/2003 | McDaniel et al. |
| 6,626,241 | B2 | 9/2003 | Nguyen |
| 6,632,527 | B1 | 10/2003 | McDaniel et al. |
| 6,732,800 | B2 | 5/2004 | Acock et al. |
| 6,749,025 | B1 | 6/2004 | Brannon et al. |
| 6,817,414 | B2 | 11/2004 | Lee |
| 6,832,650 | B2 | 12/2004 | Nguyen et al. |
| 7,073,581 | B2 | 7/2006 | Nguyen et al. |
| 7,153,575 | B2 | 12/2006 | Anderson et al. |
| 7,210,528 | B1 | 5/2007 | Brannon et al. |
| 7,244,492 | B2 | 7/2007 | Sinclair et al. |
| 7,270,879 | B2 | 9/2007 | McCrary |
| 7,426,961 | B2 | 9/2008 | Stephenson et al. |
| 2003/0205376 | A1 | 11/2003 | Ayoub et al. |
| 2003/0224165 | A1 | 12/2003 | Anderson et al. |
| 2004/0040708 | A1 | 3/2004 | Stephenson et al. |
| 2004/0094300 | A1 | 5/2004 | Sullivan et al. |
| 2004/0200617 | A1 | 10/2004 | Stephenson et al. |
| 2005/0019574 | A1 | 1/2005 | McCrary |
| 2005/0028979 | A1 | 2/2005 | Brannon et al. |
| 2005/0059558 | A1 | 3/2005 | Blauch et al. |
| 2005/0096207 | A1 | 5/2005 | Urbanek |
| 2006/0037755 | A1 | 2/2006 | Knobloch |
| 2006/0078682 | A1 | 4/2006 | McDaniel et al. |
| 2006/0146643 | A1 | 7/2006 | Allen |
| 2007/0054121 | A1 * | 3/2007 | Weintritt et al. ............ 428/403 |
| 2008/0011477 | A1 | 1/2008 | Rediger et al. |
| 2008/0202750 | A1 | 8/2008 | Rediger et al. |
| 2008/0277115 | A1 | 11/2008 | Rediger et al. |

FOREIGN PATENT DOCUMENTS

| | | |
|---|---|---|
| CA | 1185778 | 4/1985 |
| CA | 1202882 | 4/1986 |
| CN | 1508390 A | 6/2004 |
| CN | 1730422 A1 | 2/2006 |
| EP | 0169412 A1 | 1/1986 |
| EP | 1400818 A2 | 3/2004 |
| EP | 0308257 A2 | 11/2008 |
| GB | 2050467 A | 1/1981 |
| GB | 2370054 A | 6/2002 |
| GB | 2426023 A | 11/2006 |
| WO | 99/27229 A1 | 6/1999 |
| WO | WO 00/05302 | 2/2000 |
| WO | 03/011588 A1 | 2/2003 |
| WO | 03/023177 A2 | 3/2003 |
| WO | 03/089757 A1 | 10/2003 |
| WO | WO 2004/083600 | 9/2004 |
| WO | WO2004/092254 | 10/2004 |
| WO | 2005000993 A1 | 1/2005 |
| WO | 2005/095202 A1 | 10/2005 |
| WO | 2006/034298 A2 | 3/2006 |
| WO | 2008/033225 A2 | 3/2008 |

OTHER PUBLICATIONS

Currently pending U.S. Appl. No. 11/456,897, filed Jul. 12, 2006.
Currently pending U.S. Appl. No. 11/747,359, filed May 11, 2007.
Advances in Coalbed Methane, Hart Energy Publications, Chemical Week Associates, May 2003, pp. 1-16, Hart Publications, Houston, Texas, USA.
Conductivity Endurance Technology, Top Technology Solutions 2006, Apr. 2006, H04898, Halliburton.
International Search Report for PCT/US2008/062890, mailed Sep. 1, 2008, European Patent Office, Rijswijk, Netherlands.
International Search Report for PCT/US2008/063055, mailed Sep. 2, 2008, European Patent Office, Rijswijk, Netherlands.
International Search Report and Written Opinion of the International Searching Authority for PCT/US09/36326, mailed Jun. 26, 2009, nine pages, European Patent Office, Rijswijk, Netherlands.

* cited by examiner

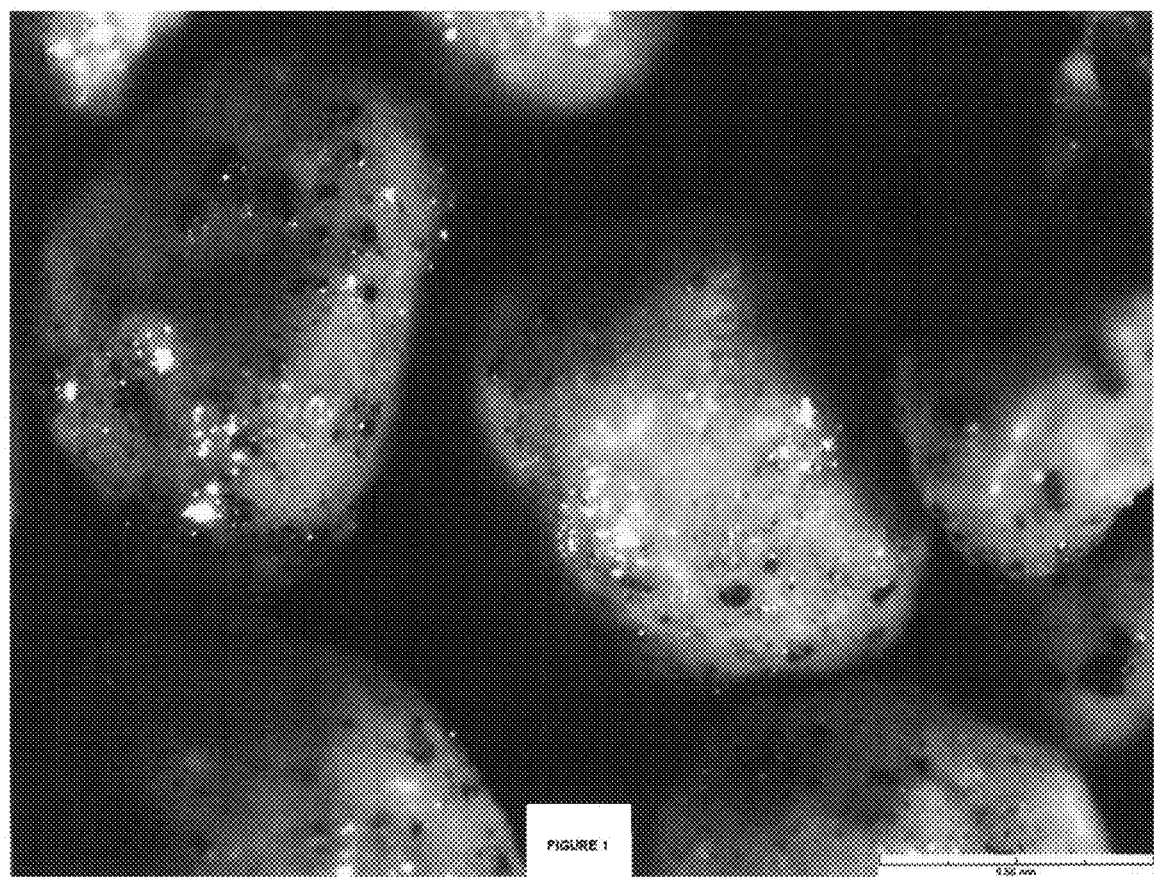

REDUCING FLOW-BACK IN WELL TREATING MATERIALS

TECHNICAL FIELD

This invention relates to particulate compositions suitable for hydraulic fracturing treatments (i.e., as a composite proppant), and also suitable for gravel packing in sand control, or for other well formation treatments. Specifically, the invention is directed to the use of a composite proppant in a method for enhancing the stabilization of, and reducing particulate flow back and fines transport in a well formation. The composite proppant comprises a proppant substrate having magnetic particles attached to the outer surface of the proppant using an adhesive binder as a coating on the proppant substrate.

BACKGROUND OF THE INVENTION

Proppants are used to keep open fractures created by hydraulic fracturing of a subterranean formation, e.g., in an oil or gas bearing strata. Typically, the fracturing is performed in a subterranean formation to increase oil or gas production. Fracturing can be caused by injecting a viscous fracturing fluid (frac fluid) at a high pressure into the well. As fractures are formed, a particulate material, referred to as a "propping agent" or "proppant" is placed in the formation to maintain the fracture in a "propped" open condition when the injection pressure is released. As a fracture forms, the proppants are carried into the well by suspending them in a fluid and filling the fracture with the slurry of proppant particles. Upon release of the pressure, the proppants lodge in the fractures so that the fractures do not close once fracturing pressure is reduced. Using proppants increases production of oil and/or gas from a subterranean formation by providing highly conductive channels through the formation for the oil and/or gas to flow to the well head.

The maintenance of these channels provides increased flow of various fluids, e.g., hydrocarbons such as natural gas and oil.

Proppant materials that have been widely used include: (1) particulate sintered ceramics, typically aluminum oxide, silica, or bauxite, often with clay-like binders or other additives to increase the particulate's compressive strength, especially sintered bauxite; (2) natural, relatively coarse, sand, the particles of which are roughly spherical, generally called "frac sand" and (3) resin-coated particulates of (1) and (2), i.e., resin-coated proppant.

One of the problems commonly encountered when using these and other such proppant materials for maintaining the fractures created in a subterranean formation in an open condition is the flow back of both proppant and other particulates through the formation with the hydrocarbon being recovered.

One approach for inhibiting such flow back centers on the use of a coated proppant, where the proppant is coated with a thermosetting resin composition. The resin is intended to cure in place creating a hard permeable mass when the proppant is lodged in the formation. Typically, the resin-coated proppant is deposited in the fractures after a large quantity of uncoated proppant material has first been deposited. In other words, the last portion of the proppant deposited in each fracture, often referred to in the art as the "tail-in" portion, constitutes the proppant coated with the thermosetting resin. Upon curing the resin, the tail-in portion of the proppant is consolidated into a hard permeable mass having a high compressive strength. With that structure in place, unconsolidated proppant and formation particulate solids are hopefully prevented from flowing out of the fractures with the recovered hydrocarbons.

Another approach to reducing the occurrence of particulate flow back is described in co-pending U.S. Application Ser. No. 11/456,897, published as US 2008-0011477 A1. In accordance with that invention, the proppant is provided with a coating of a thermoplastic resin adhesive. One particularly preferred class of thermoplastic materials is those substances commonly referred to as hot melt adhesives. By using such materials, the coating on the proppant exhibits a latent tackiness, i.e., the tackiness of the coating does not develop until the proppant is placed into the hydrocarbon-bearing formation. The latent tackiness aids in the ease of handling of this coated proppant prior to down well placement where aggregation then occurs as the thermoplastic coating thereafter softens or at least partially fuses to cause the tacky (sticky) material (adhesive) to produce agglomerates as particulates bridge one-to-another thus forming a stable framework within the fracture to provide a fluid permeable region within the subterranean formation.

U.S. Pat. No. 6,116,342 describes still another approach which attempts to provide flow back control in well fracture operations. According to the disclosed method, a combination of a proppant and a separate magnetized material is placed in the formation fractures. The magnetized material is comprised of a magnetizable metal which can be in the form of beads, fibers, strips, particles or the like, or the metal can be embedded in or coated on a non-metallic material. As the magnetized material moves into voids or channels located within the proppant bed through which both deposited proppant and natural formation particulates can flow from the formation, the magnetized material forms clusters which are held together by magnetic attraction. These clusters purportedly facilitate the formation of permeable proppant bridges. Such magnetized material-proppant bridges then impede the flow-back of proppant and formation solids, while allowing hydrocarbon flow through the formation.

This prior patent indicates that the magnetized material utilized with a particular sized proppant should have a similar size to the proppant in order to insure that the proppant bed containing the magnetized material has sufficient permeability. The patent also suggests that the magnetized material be included in a fracture or fractures with the proppant in an amount in the range of from about 0.1% to about 25% by weight of the proppant, and preferably ranges from 1% to 5% by weight of proppant.

While these techniques can be applied in an effort to control the undesired flow of solids through the formation during hydrocarbon recovery operations, the art continues to search for other techniques of fracturing and placing proppant in subterranean formations in a way to limit flow-back of both proppant and formation solids with the recovered hydrocarbon fluid.

BRIEF DESCRIPTION OF THE INVENTION

The present invention is particularly directed to the use of a composite proppant in a method for enhancing the stabilization of and reducing particulate flow back and fines transport in a well formation. The composite proppant of the present invention comprises a proppant substrate having magnetic particles attached to its surface by an adhesive binder as a coating on the surface of the proppant substrate. As such, the present invention represents an improvement of the technique described in U.S. Pat. No. 6,116,342.

Suitable proppant substrates for practicing the present invention include traditional proppant materials such as (1) particulate sintered ceramics, typically aluminum oxide, silica, or bauxite, possibly with clay-like binders or other additives to increase the particulate's compressive strength, especially sintered bauxite and (2) natural, relatively coarse, sand, the particles of which are roughly spherical, generally called "frac sand." As described below, other materials disclosed as being suitable for use as a proppant, such as newer materials designed to exhibit high crushing resistance, also can be employed.

In one embodiment, magnetic particles are attached to the surface of such the crush resistant proppant substrates, including the above-noted conventional proppant substrates. The magnetic particles may be attached to the proppant substrate using a variety of methods such as by using an adhesive coating. The amount of magnetic particles affixed to the proppant substrate may range anywhere from about 0.1 to about 10% based on the proppant substrate weight, with an amount of about 0.5 to 5% by weight of the proppant being preferred. (In the broader aspects of the present invention, similar coatings of magnetic particles may also be applied to lower density proppant substrates such as hollow glass balls, walnut hulls and sealed porous ceramics to achieve a similar effect).

In practicing the present invention, the magnetic particles can be prepared from a magnetizable metal selected from the group consisting of iron, ferrite, low carbon steel, iron-silicon alloys, nickel-iron alloys, iron-cobalt alloys and other similar magnetizable metals. The magnetizable metals are utilized as small particles that are coated in powdered form on the outside surfaces of the proppant substrates using an adhesive coating. The metal particles can be magnetized either before or after the coating operation. A preferred source of the magnetic particles is magnetite, which is a ferromagnetic mineral with chemical formula $Fe_3O_4$, one of several iron oxides, and a member of the spinel group.

As noted, small magnetite particles are a suitable source of the magnetic particles having magnetic properties. Magnetite is a ferromagnetic mineral also known as iron(II, III) oxide. Magnetite has the chemical formula $Fe_3O_4$, which is sometimes expressed as $FeO \cdot Fe_2O_3$ to more fully express the structure of the mineral.

Magnetite particles are commercially available in various average particle sizes and size ranges. Particles of a size substantially smaller than the proppant particulates are preferably used. Typically, particles having an average (number average) particle size of about 10 to about 100,000 nm, preferably between about 200 and about 80,000 nm, and usually between about 1000 and 50,000 nm can be blended with a suitable adhesive to provide a coating for the proppant particulates. Alternatively, the magnitite particles can be adhered to the adhesive coating after the coating has been applied to the proppant particulates and before the adhesive is dried (or hardened). The average particle size is selected by the practitioner to provide the magnetic performance required of the proppant while minimizing cost. For example, smaller particles provide the advantages of ease in attachment and retention on the surface of the proppant particulates. However, such small particles are relatively costly as compared with larger-sized particles. Similarly, larger particles may provide more of a magnetic effect and are available at a lower cost than smaller particles. A mix of sizes also may be used. The particles preferably are thoroughly blended if a mixture of sizes is used. Selection of the particle size of the magnetic particles can be made by the skilled practitioner with the guidance provided herein.

Composite proppants having a core of a high crush-resistant proppant substrate with a coating of magnetic particles (as noted above) adhered to the proppant surface may be prepared using a variety of processes. The proppant substrate of the composite proppant of the present invention should be sufficiently strong to withstand a closure pressure of at least 3,000 psi, preferably the crush resistance of the proppant should be sufficient to withstand a closure pressure of at least 5,000 psi, and more preferably the crush resistance of the proppant should be sufficient to withstand a closure pressure of at least 7,500 psi and higher. In one example, a crush resistant proppant substrate, e.g., a ceramic or silica sand particle, may be heated and mixed with an adhesive resin and a magnetic particulate material. The resin is added to the mixture as an adhesive for attaching the magnetic particulates to the surface of the proppant substrate. After mixing the proppant substrate, the adhesive resin and the magnetic particles for a predefined period of time, the mixture then is discharged screened and cooled.

BRIEF DESCRIPTION OF THE DRAWING

This patent or application file contains at least one drawing executed in color. Copies of this patent or patent application publication with color drawing will be provided by the Office upon request and payment of the necessary fee.

FIG. 1 illustrates a colored photomicrograph of an embodiment of a composite proppant with a coating of magnetic particles adhered using a cured novolac resin.

DETAILED DESCRIPTION OF THE INVENTION

The present invention relates to a composite proppant comprising a proppant substrate and a coating on the substrate of small magnetic particles adhered to the substrate using an adhesive binder. The composite proppant can be used in petroleum and gas production to "support/prop" hydraulic fractures in a subterranean formation. The proppant keeps the hydraulic fractures open for the inflow of petroleum and/or natural gas, and the cohesive force between the coating of magnetic particles on the separate proppant particulates facilitates the formation of an integral bed that functions much like a filter for retarding flow back.

The invention also relates to the coated proppant substrate as a composite proppant and to methods for making and using these composite proppants.

According to one or more arrangements of the present invention, fractures in subterranean formations may be created by injecting a treating fluid (e.g., a fracture fluid or frac fluid) into the subterranean formation. Procedures for hydraulically fracturing a formation and suitable fracturing fluids for use in such procedures are known to those skilled in the art and do not form part of the present invention (see for example U.S. Pat. Nos. 6,059,034 and 6,330,916). The treating fluid (hydraulic fracturing fluid) is injected at a high pressure to force the creation of subterraneous fractures. In oil drilling operations, subterraneous fractures may increase the size and number of channels through which oil and/or other hydrocarbons may be extracted. Creating fractures in a subterranean formation generally enhances the flow of the hydrocarbon material (e.g., oil) being extracted during recovery operations.

To maintain these fractures open, as is well known, proppants are injected and lodged in the fractures. Without a supporting structure (provided by the proppant) to hold the fractures open, the fractures likely would close to some extent impeding the subsequent flow of the hydrocarbon fluid through the fractured formation. Proppants are typically transferred in the initial injection of fracture fluid or may be included in a subsequent injection of fluid into the formation for retaining the fractured formation in an open position. In many instances, fractures may be created in areas far from the fluid injection point. The chemistry of suitable fracturing fluids for transporting proppants throughout a subterranean formation are known and do not need detailed description herein as such fluids do not form a critical part of the present invention. Once the coated composite proppants of the present invention reach a fracture, the proppants lodge within the fracture and aided by the coating of magnetic particles on their surface, agglomerate to form a stable framework within the fracture to provide a fluid permeable region.

In order to prepare the composite proppant of the present invention, a crush resistant proppant substrate, which typically comprises a particulate material, such as sand, a naturally occurring mineral, such as fused zirconia, a ceramic, such as sintered bauxite, or a sintered alumina, or another non-ceramic refractory such as milled or glass beads, as well as their resin-coated counterparts, is coated with magnetic particles. The proppant substrate used for preparing the composite proppant of the present invention should be sufficiently strong to withstand a closure pressure of at least 3,000 psi, preferably the crush resistance of the proppant substrate should be sufficient to withstand a closure pressure of at least 5,000 psi, and more preferably the crush resistance of the proppant substrate should be sufficient to withstand a closure pressure of at least 7,500 psi and higher.

The proppant substrate, such as sand or a ceramic (optionally pre-coated with a resin), generally has a distribution of particles having sizes in the range of from about 4 mesh to about 100 mesh (U.S. Standard Sieve numbers)(i.e. the particles pass through a screen opening of about 4760 microns (4 mesh) and are retained on a screen opening of about 150 microns (100 mesh)). Preferred proppant substrates have a distribution of particle sizes in the range of 8 mesh to 60 mesh, and more usually in the range of 16 mesh to 50 mesh ((preferably at least 90% by weight of the particles satisfy such mesh size range)). Particularly preferred proppant substrates have a distribution of particle sizes with at least 90% by weight of the particles having a size within the range of 20 mesh to 40 mesh, i.e., between about 850 and about 425 microns.

In accordance with the present invention, the proppant substrate then is provided with a coating of magnetic particles. In the broadest aspects of the present invention, the proppant substrate can be and preferably is coated with pre-magnetized metal particles, such as magnetite. The magnetic particles can be incorporated into a coating on the proppant substrate by being premixed into a resin composition used to coat the proppant substrate, or by separately adding the particles during the proppant coating process. Alternatively, the proppant substrate can instead be coated in the same way with magnetizable metal particles and then the composite proppant can be passed through a magnetic field to magnetized the particles in place on the coating. In this latter case, the magnetic treatment can be performed prior to, or after suspending the coated proppant in the fracturing fluid.

Preferably, the magnetic particles have a particle size smaller than the proppant substrate particulates, usually the magnetic particles have an average (i.e., a number average) particle size 50% smaller than 90% by weight of the proppant particulates, and more preferably the magnetic particles have an average (i.e., a number average) particle size an order of magnitude smaller than 90% by weight of the proppant particulates. In one embodiment, the magnetic particles have a distribution of particles sizes in the range of 30 mesh to smaller than 635 mesh (U.S. Standard Sieve numbers), i.e., a particle size smaller than 600 microns and possibly smaller than 20 microns. As is conventional, when a mesh size range is recited, it means that the distribution of particles pass through the screen with the more open mesh size recited in the range and are retained on the screen having the less open (more closed) mesh size recited in the range. For the most part, at least 90% by weight of the particles in a given sample are intended to have the recited distribution. Usually, the magnetic particles have a distribution of particle sizes in the range of 100 mesh to smaller than 635 mesh, i.e., a particle size smaller than 150 microns and as small as 20. Preferably, the magnetic particles have a distribution of particle sizes in the range of 170 mesh to smaller than 635 mesh, i.e., a particle size smaller than 90 microns and as small as 20 microns.

To prepare the composite proppant of the present invention, the magnetic (or magnetizable) particulates are adhered to the surface of the proppant substrate. In a preferred embodiment of the present invention this is accomplished by affixing the particulates to the surface of the proppant substrate using an adhesive binder. An adhesive typically is applied in an amount of 1 to 10 weight percent of the proppant substrate, and more usually in an amount of 2 to 5 percent. In the broadest aspect of the invention a wide variety of adhesives can be used, including phenolic resins, urea resins, isocyanate resins, epoxy resins and the like. The nature of the adhesive resin is not narrowly critical.

One particularly common adhesive for use in the present invention is the class of phenol-formaldehyde novolac resins commonly used to coat conventional proppants. Phenol-formaldehyde novolac resins can be produced by reacting a molar excess of phenol with formaldehyde in the presence of an acid catalyst, such as sulfuric acid, hydrochloric acid or, oxalic acid (usually in an amount of 0.2 to 2% by weight based on the phenol). Maintaining the mole ratio of phenol to formaldehyde at, for example, 1:0.7-0.9, is common when preparing such resins. However, the present invention is not to be limited to any particular type of novolac resin.

Novolac resins are thermoplastic, i.e., they are not self-crosslinkable. Novolac resins are converted to cured resins by, for example, reacting them under heat with a crosslinking agent, such as hexa (also called hexamine or hexamethylenetetramine), or for example, by mixing them with a solid acid catalyst and paraformaldehyde and reacting them under heat. Novolac resins also may be cured with other cross linkers such as resoles and epoxies.

Novolac resins have long been used for the coating of proppants. A solid novolac resin, generally in flake form, is added to preheated proppant (200° F. to 400° F.)(93° C. to 204° C.) in a suitable production coater, the temperature being above the melt point of the novolac (typically 170° F. to 200° F.)(77° C. to 93° C.). The heat causes the novolac resin to melt and the mixing action uniformly coats the surface of the proppant. Subsequent to achieving uniform coating, an aqueous solution of hexa typically is added. The added water cools the coated proppant through evaporation as the hexa is distributed throughout the resin. This cooling rapidly drops the temperature of the coated proppant and initially prevents the curing of novolac resin by the added hexamine. The so-coated proppant can be discharged at this point, further cooled and screened. When used, the presence of the hexamine in the novolac coating allows the coating to cure under the elevated temperature conditions encountered in the subterranean formation (cured-in-place). In an alternative process, the novolac-hexamine coating may be allowed to achieve full cure in the mixer itself, prior to discharge of the coated proppant (pre-cured coating). These coating and curing techniques are well known and understood in the prior art and can be adapted with only routine experimentation for use in affixing the magnetic (or magnetizible) particles to the proppant substrate in connection with the present invention.

In accordance with the present invention, the conventional procedure for making a coated proppant with a novolac resin is modified by including the magnetic (or magnetizable) particles along with the molten novolac resin and proppant in the mixing operation. Thus, when the coating is cooled, the particles become adhered to the surface of the proppant substrate though the adhesive action of the novolac resin. Alternatively, the magnetic (or magnetizible) particles can be added to the solid novolac resin in an operation separate from, i.e., prior to, to coating operation. This embodiment is illustrated in the following specific examples.

In another embodiment of the invention, the adhesive used to adhere the magnetic (or magnetizible) particles to the proppant substrate may be a thermoplastic resin of the type disclosed in co-pending U.S. application Ser. No. 11/456,897, the disclosure of which is incorporated herein by reference.

In particular, various types of thermoplastic materials that may be used as an adhesive for adhering the magnetic (or magnetizible) particles to the proppant substrate in this embodiment of the invention broadly include polyethylene; polypropylene; SIS (styrene-isoprene-styrene) copolymers; ABS copolymers (i.e., acrylonitrile-butadiene-styrene); SBS (styrene-butadiene-styrene) copolymers; polyurethanes; EVA (ethylene vinyl acetate) copolymers; polystyrene; acrylic polymers; polyvinyl chloride and other similar fluoroplastics; pine rosins and modified rosins, such as rosin esters including glycerol rosin esters and pentaerythritol rosin esters; polysulfide; EEA (ethylene ethyl acrylate) copolymers; styrene-acrylonitrile copolymers; nylons, phenol-formaldehyde novolac resins, waxes and other similar materials and their mixtures. Particularly preferred for use as the thermoplastic adhesive material are those substances commonly referred to as hot melt adhesives. For example, hot melt adhesives such as Opt-E-Bond™ HL0033 manufactured by the HB Fuller Co., and Cool-Lok™ 34-250A manufactured by National Adhesives may be used as an adhesive for attaching the magnetic (or magnetizible) particles to the crush resistant proppant substrate. Other adhesive options include pine rosins and modified rosins marketed by Georgia-Pacific Corporation as NOVARES® 1100 and NOVARES® 1182.

One of the benefits of using such a thermoplastic resin as the adhesive in connection with the composite proppant of the present invention is that after the thermoplastic coated proppants is lodged in a fracture, thermal energy in the subterraneous formation causes the thermoplastic to become tacky (sticky) and fuse with other similarly thermoplastic-coated proppants and thus acting in concert with the magnetic particle coating to form a supporting framework for keeping the fracture open. Furthermore, the tacky (sticky) nature of the thermoplastic coated proppants is expected to help keep the magnetic particles from eroding from the proppant substrate and/or help to capture any eroded particulates and may also capture other loose solid particulates in flow-backs. As such, the amount of solid material that is extracted with the desired hydrocarbon, e.g., petroleum, may be further controlled or reduced further enhancing flow back reduction.

In one example of the present invention, a powdered magnetite is mixed with a molten thermoplastic resin and the molten mixture is coated on a proppant substrate to yield a composite proppant. Alternatively, powdered magnetite (or other equivalent material) can be mixed with a molten thermoplastic resin that then is cooled to form a solid form of the resin (e.g., flake) with magnetic (or magnetizible) particles distributed through its mass. The so-formed resin is then used to coat the proppant substrate. Thus, not only is the composite proppant provided with an inherent tackiness, the composite proppant also has an enhanced cohesiveness due to the adherence of the magnetic particles on the proppant.

The amount of magnetic particles used in the coating on the proppant substrate may broadly range from about 0.5 weight % to about 50.0 weight % based on the weight of the proppant substrate. If desired, the invention allows high levels of magnetic particles to be adhered to the proppant substrate, e.g., above 25% up to 50% by weight of the proppant. Most often, the amount of magnetic particles used in the coating on the proppant substrate may range from about 1 weight % to about 5 weight % based on the weight of the proppant substrate.

As noted above, the proppant substrates coated with the magnetic particles may comprise any particulate material with sufficient crush resistance to be useful as a proppant and may include commonly used proppant substrates such as silica sand, ceramics, bauxite and the like, as well as their resin pre-coated alternatives.

With respect to size, composite proppants of the present invention typically have a particle size distribution in the range of about 4 mesh to 100 mesh (mesh size according to the U.S. Standard Sieve Series). Generally, at least 90% by weight of the particulates (e.g., composite proppants) added to the treating or fracturing fluid have a size falling within this range. Preferably, at least 90% by weight of the particulates have a size distribution of 8 to 60 mesh, and more preferably 16 to 50 mesh. In some particularly preferred arrangements, at least 90% by weight of the particulates have a particulate distribution size in the range of 20 mesh to 40 mesh.

According to one or more embodiments, proppant substrates of lower apparent specific gravity may also be used. These types of proppants may include natural or synthetically produced materials and structures such as hollow glass balls, walnut hulls and porous ceramics. Using proppants having relatively lower apparent specific gravities may reduce the viscosity and pressure required to pump the fluid carrying the proppant through the subterranean formation.

While the discussion herein refers to well drilling operations in particular, one of ordinary skill in the art will appreciate that the use of the composite proppants according to the present invention may be used in a variety of other applications and operations as well. For example, in addition to the oil drilling operations discussed above, the composite proppants may be used in gravel packing procedures in which a screening device is placed in a wellbore. Other hydrocarbon recovery-related operations may also benefit from the use of the composite proppants of the present invention as will be apparent to a worker skilled in such related procedures.

As noted above, the composite proppants described herein may be prepared using a variety of processes. In one example, silica sand coated with magnetite powder may be prepared by initially heating the uncoated sand, adding a hot melt adhesive and mixing the sand with the adhesive for a predefined amount of time. Subsequently, powdered magnetite may be added to heated mixture, coating the silica sand with the magnetite particles. The formation of the composite proppant may include multiple steps of adding adhesive to insure that the magnetite particles coat the silica sand sufficiently. Once the sand has been sufficiently coated with the magnetite particles, the composite proppant is cooled and discharged, and then screened to the desired particle size distribution.

One of ordinary skill in the art will appreciate that the amount of substrate, resin and magnetic particulate coating material may vary based on the desired degree of coating, weight of the substrate, type of substrate, type of resin and other factors.

The present invention also pertains to a method of propping a subterranean formation using a proppant composition that consists essentially of the composite proppant of the present invention as the solids component and a carrier fluid for the proppant. In particular, in the method of using the composite proppant in accordance with the present invention, when the composite proppant of the present invention is introduced into the well formation with a carrier fluid, the composite proppant particulates comprise at least 60%, preferably 70%, more preferably 80% and generally 90% or higher (i.e., up to 100%) by weight of the proppant particulates then being introduced into the formation. In other words, proppant not having a surface coating of the magnetic particles are only introduced in a minor amount, or more preferably are not introduced except in a very minor amount (if at all) into the well formation at the same time (i.e., with the same carrier fluid in the proppant composition) that the composite proppant particulates of the present invention are introduced. In this way, the ability of the proppant composition to produce a framework structure within the formation that can successfully reduce particulate flow back is significantly improved, relative to the method described in U.S. Pat. No. 6,116,342.

The method of the present invention has particular utility when the composite proppant is used as the "tail-in" portion of a well treatment operation, i.e., the tail-in portion of the proppant composition in the well treatment operation consists essentially of the composite proppant of the present invention.

In order to prevent the composite proppant having the magnetized particle coating from magnetically attaching to the well casing or to a liner in the well bore before entering the fractured zone, the fracturing fluid containing the composite proppant should be pumped at a sufficient rate to erode or scour any attached composite proppant from the walls of the casing or liner.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

EXAMPLE 1

A proppant resin having embedded magnetite particles was prepared. About 1210 grams of solid flake novolac resin (available from Georgia-Pacific as GP-2202 proppant resin) was melted at 140 to 150° C. To the molten novolac, 173 grams of powdered magnetite with an average particle size of 15 microns (15,000 nm) along with 12 grams of solvent, DBE-2 (DBE-2 is understood to contain about 20% to about 35% dimethyl adipate, about 65% to about 80% dimethyl gluterate, and up to 3% maximum of dimethyl succinate available from DuPont, Wilmington, Del.), for viscosity control. The molten mixture was formed into a thin sheet and allowed to cool. The cooled magnetite impregnated resin was broken into small pieces.

EXAMPLE 2

3000 grams of a proppant substrate was preheated in an oven to 450-500° F. (232-260° C.) and then added to a preheated mixer. Both standard Frac sand (20/40 silica sand from US Silica) and a 20/40 ceramic proppant from Carbo Ceramics were used as proppant substrates). When the temperature within the mixer, as measured by IR, indicated 400° F. (204° C.), 107 grams of the magnetic resin of Example 1 was added (this provided about 0.5% by weight of magnetic particles based on the weight of the proppant. After mixing for about 10 seconds, 15.8 grams of powdered hexa (hexamethylene tetramine) and 2 grams of wax were added. Then, mixing was continued for an additional two minutes and the coated proppant was then discharged and allowed to cool to room temperature. By itself, the proppants coated at the level of about 0.5 weight percent magnetite did not exhibit much magnetic cohesion, although they were attracted and were held to a magnet.

FIG. 1 is a colored photomigrograph of the composite proppant of this example having magnetite particles attached by the resin adhesive to the surface of the proppant substrate. The magnetite appears as dark specs on the surface of the opaque proppant substrate.

EXAMPLE 3

The coated composite proppant of Example 2 was subjected to a magnetizing treatment by passing the coated proppant particles through a half inch diameter by fifteen inches long plastic pipe which was surrounded by five permanent magnets attached and equally spaced but offset 90° from one another. The coated proppant material was passed through the magnetic field established in this device several times before then being tested.

To test the resulting composite proppant for its relative cohesiveness, equal amounts of the composite proppant of this Example and a conventional novolac-coated ceramic proppant were placed on a horizontal glass plate. The plate was elevated at an angle of approximately 45° and tapped several times. The ceramic proppant coated with resin without the magnetite rolled off the plate, while the proppant having the resin coating with the adhered magnetic particles remained as a single mass on the plate, thus demonstrating the effectiveness of the magnetic cohesiveness.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

We claim:

1. A method for treating a subterranean formation comprising introducing into fractures in the formation particles comprising a composite proppant, said composite proppant comprising a core of a proppant substrate having an adhered coating of magnetic metal particles, wherein the magnetic metal particles comprise 0.1% to 10.0% of the composite proppant by weight and wherein the proppant substrate is sufficiently strong to withstand a closure pressure of at least 3,000 psi.

2. The method of claim 1, wherein the proppant substrate is selected from the group consisting of bauxite, silica sand and porous ceramic, optionally coated with a resin.

3. The method of claim 1, wherein the magnetic metal particles comprise magnetite.

4. The method of claim 1, wherein the magnetic metal particles comprise above 0.5% to 5.0% by weight of the composite proppant.

5. The method of claim 1, wherein the magnetic metal particles are adhered to the proppant substrate using a hot melt adhesive.

6. The method of claim 1, wherein the magnetic metal particles are adhered to the proppant substrate using a novolac resin crosslinked with a hexamine.

7. The method of claim 5, wherein the hot melt adhesive includes a thermoplastic resin.

8. The method of claim 3, wherein the magnetite comprise 0.5% to 5.0% by weight of the composite proppant.

9. A particulate composite proppant comprising a proppant substrate having an adhered coating of magnetic metal particles, wherein the magnetic metal particles comprise 0.1% to 10.0% of the composite proppant by weight and wherein the proppant substrate is sufficiently strong to withstand a closure pressure of at least 3,000 psi.

10. The particulate composite proppant of claim 9 further comprising an adhesive adhering the magnetic metal particles to the proppant substrate.

11. The particulate composite proppant of claim 10, wherein the adhesive includes a thermoplastic resin.

12. The particulate composite proppant of claim 10, wherein the adhesive includes a wax powder.

13. The particulate composite proppant of claim 9, wherein the magnetic metal particles comprise magnetite.

14. The particulate composite proppant of claim 13, wherein the magnetite comprises 0.5% to 5.0% by weight of the particulate composite proppant.

15. The particulate composite proppant of claim 9, wherein the proppant substrate comprises at least one of a porous ceramic, silica sand, bauxite and hollow glass, optionally having a resin coating.

16. The particulate composite proppant of claim 14, wherein the proppant substrate comprises a particulate silica sand.

17. A particulate composite proppant comprising a proppant substrate having an adhered coating of magnetic metal particles, wherein the magnetic metal particles comprise 0.5% to 50.0% of the composite proppant by weight and wherein the proppant substrate is sufficiently strong to withstand a closure pressure of at least 3,000 psi.

18. The particulate composite proppant of claim 17, wherein the magnetic metal particles comprise over 0.5% to 5.0% of the composite proppant by weight.

19. The method for treating a subterranean formation of claim 1 wherein the composite proppant of the present invention is introduced into the fractures of the subterranean formation with a carrier fluid to form a proppant composition, and the composite proppant particulates comprise at least 80% by weight of the particulates in the carrier fluid.

* * * * *